(12) United States Patent
La Fiandra

(10) Patent No.: US 6,181,459 B1
(45) Date of Patent: Jan. 30, 2001

(54) DEFORMABLE MIRROR WITH REMOVABLE ACTUATOR USING SHAPED-MEMORY ALLOYS

(75) Inventor: Carlo La Fiandra, New Canaan, CT (US)

(73) Assignee: Raytheon Company, Lexington, MA (US)

(*) Notice: Under 35 U.S.C. 154(b), the term of this patent shall be extended for 0 days.

(21) Appl. No.: 09/326,761

(22) Filed: Jun. 4, 1999

(51) Int. Cl.⁷ .............................. G02B 26/00; G02B 26/08
(52) U.S. Cl. .............................................. 359/290; 359/224
(58) Field of Search ...................................... 359/224, 290; 29/447, 469.5; 285/381.1, 381.2, 381.4

(56) References Cited

U.S. PATENT DOCUMENTS

| | | | |
|---|---|---|---|
| 5,485,667 | * | 1/1996 | Kleshinski ............................ 29/447 |
| 5,535,043 | * | 7/1996 | LaFiandra et al. ................. 359/224 |
| 5,917,644 | * | 6/1999 | LaFiandra et al. ................. 359/290 |
| 5,940,203 | * | 8/1999 | LaFiandra et al. ................. 359/290 |
| 6,011,639 | * | 1/2000 | LaFiandra et al. ................. 359/224 |
| 6,019,025 | * | 2/2000 | St. Amand ........................... 89/1.817 |
| 6,084,332 | * | 7/2000 | LaFiandra et al. ................. 310/311 |
| 6,102,294 | * | 8/2000 | Swartz et al. .................... 235/462.36 |

FOREIGN PATENT DOCUMENTS

9/229781 * 9/1997 (JP).

* cited by examiner

Primary Examiner—Ricky Mack
(74) Attorney, Agent, or Firm—William C. Schubert; Glenn H. Lenzen, Jr.

(57) ABSTRACT

An assembly used in a deformable mirror comprises a support having at least one opening therein. A thin optical substrate making up the mirror is provided and has a light reflective first surface and an opposite back surface. A coupling is provided for controllably movably coupling the back surface of the optical substrate and the support to one another. The coupling includes at least one shaped memory metal cylindrical part operatively connecting the optical substrate and the support.

10 Claims, 4 Drawing Sheets

DEFORMABLE MIRROR WITH REMOVABLE ACTUATOR USING SHAPED-MEMORY ALLOYS

CROSS REFERENCE TO RELATED APPLICATIONS

This application relates to U.S. application Ser. Nos. 08/293,787, now U.S. Pat. No. 5,535,043 entitled, "DEFORMABLE MIRROR WITH REMOVABLE ACTUATORS; 08/965,440, now U.S. Pat. No. 6,011,639, entitled MONOLITHIC DEFORMABLE MIRROR ASSEMBLY; 08/992,022 now U.S. Pat. No. 6,084,332, entitled, HIGH ACTUATOR DENSITY DEFORMABLE MIRROR; 08/982,920, now U.S. Pat. No. 5,940,203, entitled, HUGH ENERGY BURST DEFORMABLE MIRROR; 09/071,510, now U.S. Pat. No. 5,917,644, entitled INTEGRAL HIGH ENERGY BUTTON DEFORMABLE MIRROR, and U.S. Pat. No. 5,745,278 entitled INNOVATIVE DEFORMABLE MIRROR ACTUATOR CONFIGURATION.

FIELD OF THE INVENTION

This invention relates to deformable mirrors that are used in atmospheric correction systems as well as in high and low energy laser beam train lines. The invention can also be applied commercially anywhere there is a need for low cost, easily assembled and removable actuator arrays.

BACKGROUND OF THE INVENTION

The invention is a configuration of a deformable mirror that permits easy actuator replacement. What is unique is the use of shaped-memory alloys to achieve this in a minimum space. This characteristic makes the invention applicable to high spatial frequency deformable mirrors such as are currently used in atmospheric correcting system (SAAO) and airborne laser weapon programs where the actuators are 7 mm apart.

As discussed in U.S. Pat. No. 5,745,278, deformable mirrors primarily intended for use as a beam train optic require frequency response, reliability, and low cost of manufacture as critical to the design, performance and usefulness. Thus the invention has particular usefulness in deformable mirrors that are used in adaptive optical systems. This would include low and high energy beam train configuration; that is both atmospheric correcting systems (SAAO) as well as laser weapon systems.

A deformable mirror which is used as a downstream optic in conjunction with a substantially larger optical system which is disposed upstream thereof must possess a high degree of sensitivity with respect to its ability to make highly minute adjustments to the reflective surface of the mirror. This is because such optical downstream mirrors represent the upstream optics in miniature. Such mirrors have a diameter in the range of five to fifteen inches, but for the larger sizes use on the order of about one thousand separate piezoelectric actuators to effect such adjustments. As can be expected, the nearly one thousand piezoelectric actuators used are highly miniaturized and make assembly and disassembly of the approximately one thousand piezoelectric actuators and the deformable mirror, when necessary, painstakingly tedious.

Current state-of-the art deformable mirrors such as SAAO must be satisfied with degraded performance if any of its 941 actuators fail since they are very difficult to replace. This replacement includes a complete replacement of the optical faceplate, a very difficult process. It is known to mechanically decouple the nose of the actuator from the back of the face plate, such as by cutting it with a wire saw. Other techniques involve melting epoxy joints with the application of heat to remove actuators. Heretofore, however, there are no known methods that utilize shaped-memory alloys, either with cooling or heating for replacing individual actuators.

Thus an object of the invention is to permit easy replacement of actuators in deformable mirrors thus maintaining their required performance characteristics without degradation with reasonable cost and schedule impacts.

Accordingly, it is an object of the present invention to provide deformable mirror actuation using individual piezoelectric actuators connected via shaped-memory alloys to the reaction plate thereby permitting disassembly inherent in systems utilizing such actuators.

Still a further objective of the invention is to provide a stress and strain free connection between the mirror and the supporting structure.

Yet still a further object of the invention is to provide a method of disassembly and reassembly that does not require high or low temperatures (below −60° F.).

Yet still a further object of the invention is to provide a means of in situ actuator replacement.

SUMMARY OF THE INVENTION

The invention resides in an assembly comprising a support having at least one opening therein. A thin optical substrate is provided and has a light reflective first surface and an opposite back surface. A coupling means is provided for controllably movably coupling the back surface of the optical substrate and the support to one another. The coupling means includes at least one shaped memory metal cylindrical part operatively connecting the optical substrate and the support.

DETAILED DESCRIPTION OF THE PREFERRED EMBODIMENT

Shaped-memory metal is used because of the significant dimensional changes that it can undergo with reasonable temperature changes −60° F. cooling medium is readily commercially available. The key issue is that even though the dimensions of the parts used in this invention are small, sufficient interference fits and dimensional changes can be achieved that result in mechanical "clamping" and releasing capability. This "clamping" force must be capable of acting against the force the actuator provides to the back of the mirror without permitting relative movement to the parts. Typical materials such as aluminum change dimension with temperature 13 to 14 parts per million per degree F. Shaped memory metal subjected to two to three hundred degrees F. temperature change will undergo a change in crystalline state that results in dimensional changes in the order of 2 to 4 parts per hundred. This is a significant dimensional change such that forces are introduced that are sufficient to prevent movement between parts.

Figure 1:
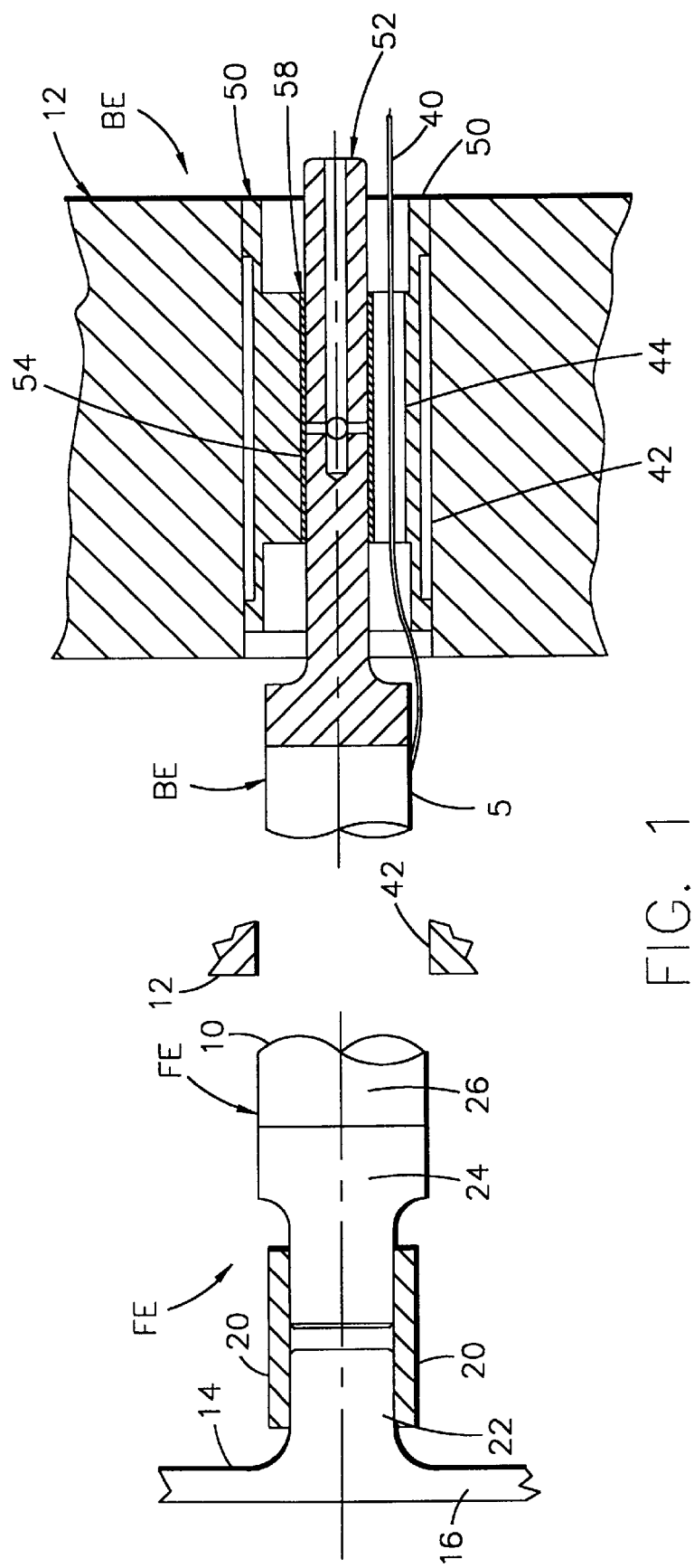
FIG. 1 is a partially fragmentary vertical section view of the front end of the actuator stem and mirror connection as well as a vertical sectional view of the back end through an actuator and the structure to which it is mounted.

As shown in FIG. 1, the invention shows an actuator 10 connected at its back end to the reaction structure 12, and on the front to the back side 14 of a deformable mirror 16. A connection is made between the actuator 10 front end FE and the rear face of the mirror 16. That is, the actuator front end FE is coupled to the back side of the mirror by a cylindrical compression fitting 20 of shaped memory metal simultaneously compressing the cylinder fitting 20 onto a mount 22 formed on the back of the mirror and onto a corresponding cylindrical structure 24 formed on the nose 26 of the actuator stem. This connection produces an axially holding frictional force capable of transmitting the axial load of the actuator to the mirror.

Figure 2:
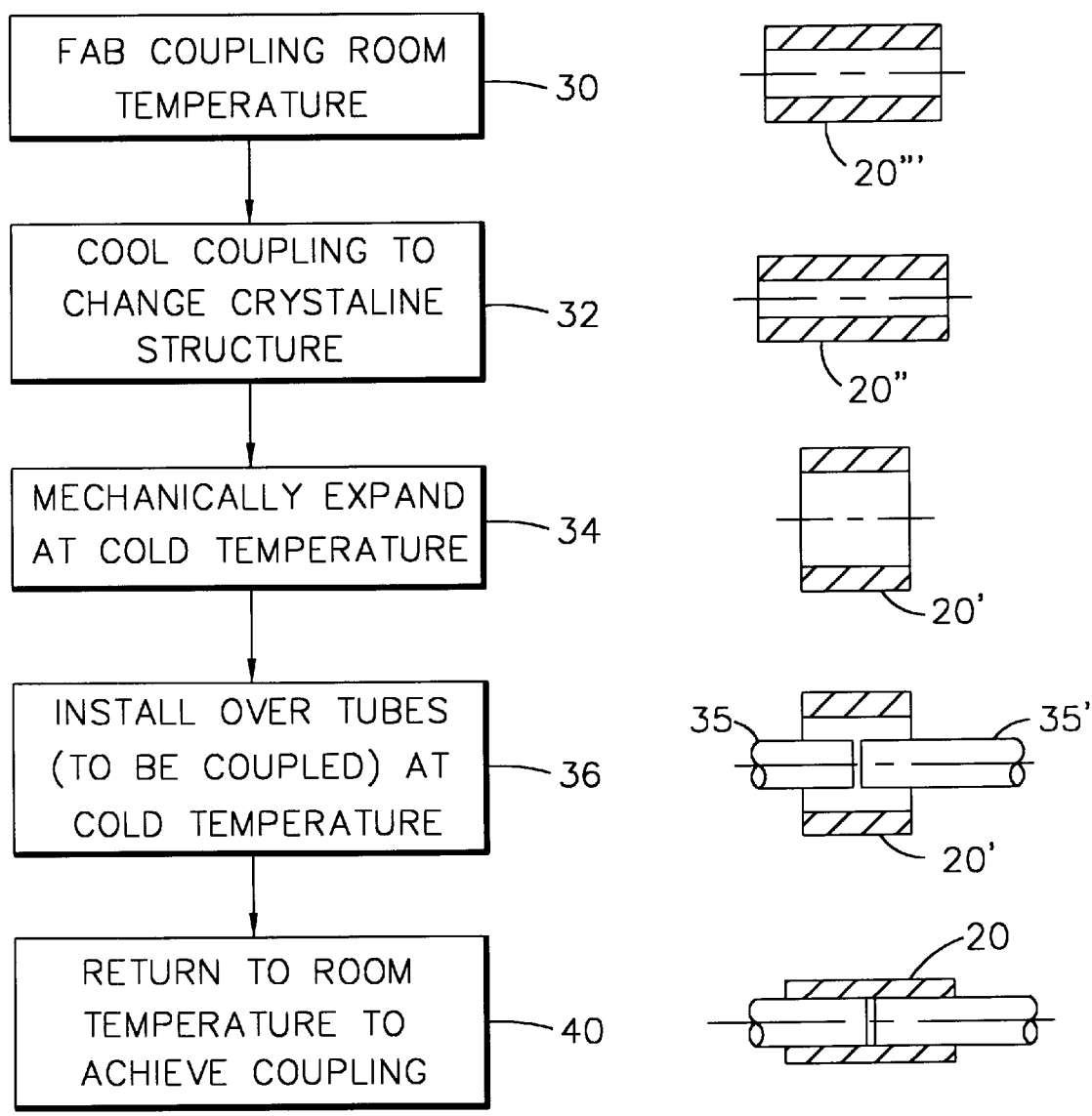
FIG. 2 is a flow chart of the process by which the front end actuator stem and the mirror mount are connected.

Referring for the moment to FIG. 2 and to the method of forming the connection of the invention, it should be seen that the principle of operation of this coupling involves the application of a cold medium, such as liquid nitrogen, to enlarge the fitting 20 resulting in undoing the mechanical connection to the mirror. The shaped alloy metal remembers that at low temperature it is larger in diameter. Restoring the coupling to room temperature restores the grip. Specifically, in step 30 the fitting 20''' is fabricated at room temperature. Then the fitting 20'' is cooled to change its crystalline structure (step 32). At the cooled temperature, the fitting 20' is mechanically expanded to enlarge its overall diameter (step 34). The fitting 20' is then installed over coaligned tubes 35, 35' (step 36). Thereafter, the fitting 20 is allowed to return to room temperature whereupon the fitting shrinks over the tubes 35, 35' (step 40).

As seen in FIG. 1, the actuator 10 is received within an opening 42 formed in the reaction structure 12. The actuator is comprised of a sleeve 50 which is mounted into the opening 42 in accordance with a further feature of the invention and further has an internal confine 54 which receives an actuator stem 52. The back end BE of the actuator 10 facing the reaction structure 12 has several different requirements compared to the front end FE. That is, the actuator 10 has a slot 44 which includes leads 40 which connect to electronic components. An epoxy pinning 58 is provided between the stem 52 and the internal confine 54 of the sleeve to ensure a moment (stress and strain) free connection. The use of the available volume must be maximized because of the close spacing of the actuators.

Figure 3:
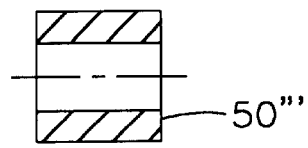
FIG. 3 is a flow chart of the process by which the actuator stem and the back end sleeve are connected.
Figure 3:
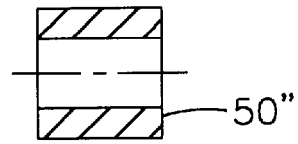
Figure 3:
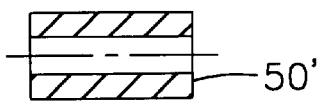
Figure 3:
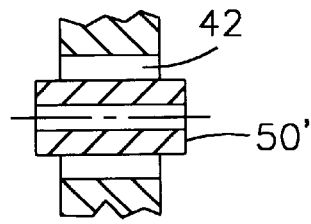
Figure 3:
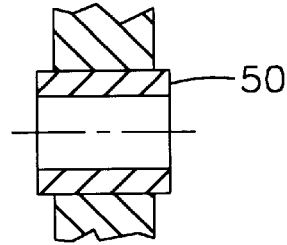
Figure 3:
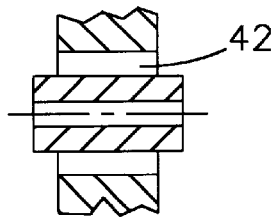
Figure 3:
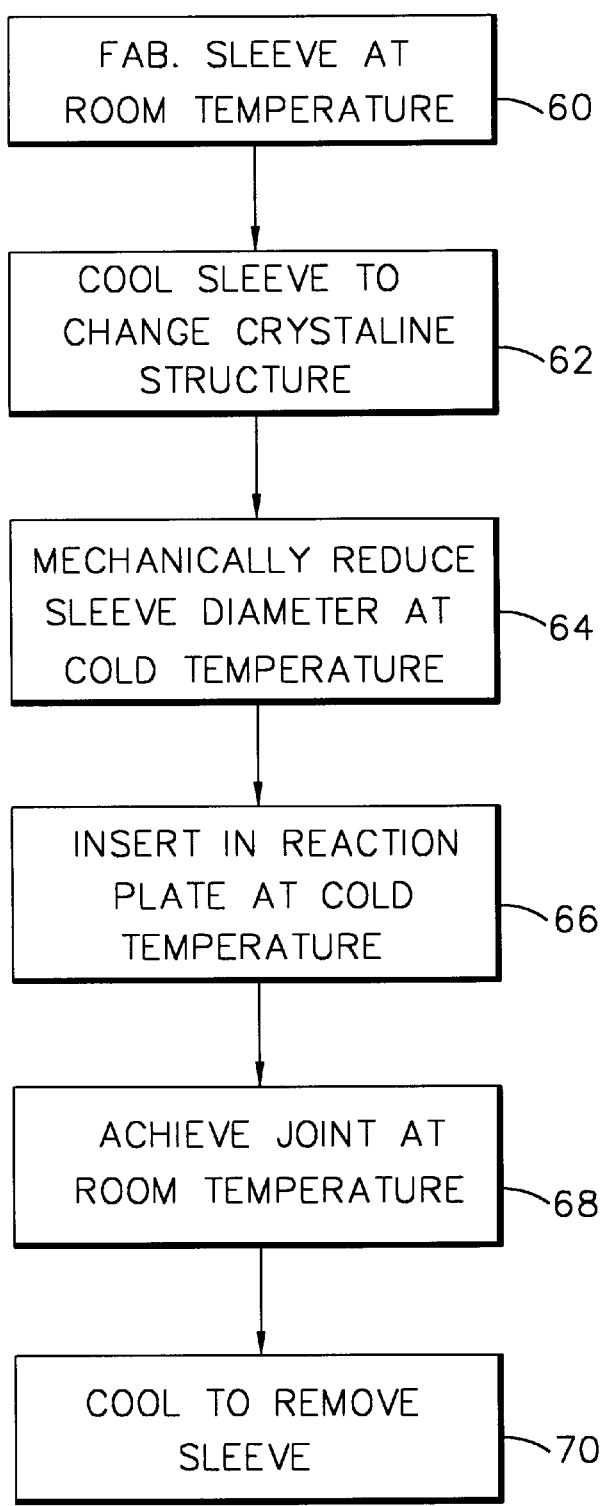

In further accordance with the invention, it should be seen that the invention resides in a method by which the sleeve 50 is connected and disconnected to the reaction plate 12 as best seen in FIG. 3. Specifically, in step 60 the sleeve 50''' is fabricated at room temperature (Step 60). Then the sleeve 50'' is cooled to change its crystalline structure (step 62). At the cooled temperature, the fitting 50' is mechanically reduced to decrease its overall diameter (step 64). The sleeve 50' is then installed into the opening 42 in the reaction plate 12 (step 66). Thereafter, the sleeve 50 is allowed to return to room temperature whereupon the sleeve expands into the opening 42 (step 68). Moreover, where necessary, at step 70, it is further possible cool the sleeve 50 after being mounted within the opening 42 in the reaction structure plate 12. Note that the shape-memory alloy works in both directions in this application, (i.e., expanding or contracting with cold).

Figure 4A:
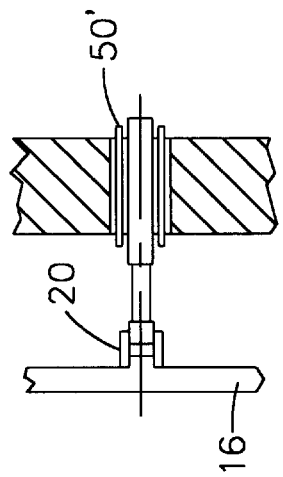
FIGS. 4a–4f show a method for attaching the actuator to the supporting structure.
Figure 4B:
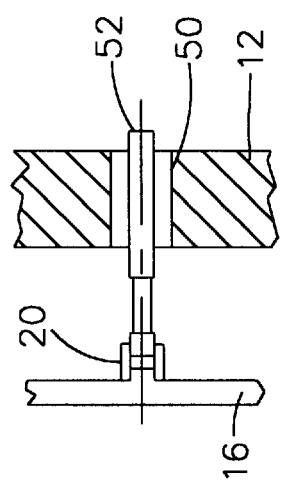
Figure 4C:
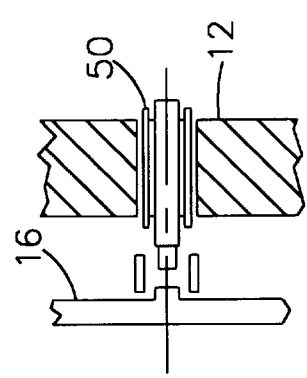
Figure 4D:
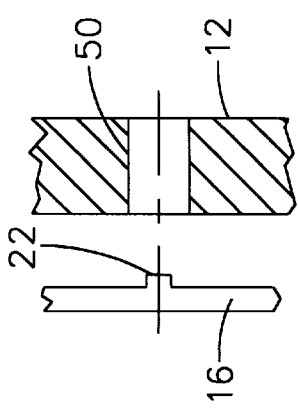
Figure 4E:
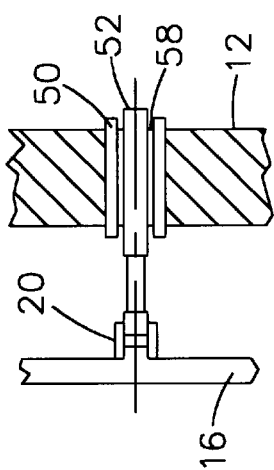
Figure 4F:
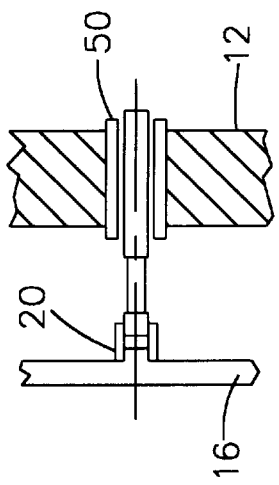

Referring now to FIGS. 4a–4f, it should be seen that the method of connecting an actuator 10 to the reaction plate 12 begins as illustrated in FIG. 4a with providing the mirror 16 so that its back 14 with the mount 22 faces the reaction plate 12. Thereafter, as seen in FIG. 4b, the actuator stem 52 is inserted within the opening 50 and is aligned with the mount 22 and the fitting 20 is then disposed over the ends of the stem 52 and the mount 22 in the manner set forth above regarding FIG. 2. As seen in FIG. 4c, the sleeve 50' in its cooled state is then inserted within the opening 50 about the stem 52 and allowed to warm to room temperatures seen in FIG. 4d. The epoxy joint 58 is next formed to affix the stem 52 to the sleeve 50. In the event that the actuator 10 needs to be removed from the assembly, the sleeve 50 and the fitting 20 are cooled as set forth above to effect removal. It is noted that temperature changes do not generally adversely effect adjacent parts and that no forces are transmitted to the mirror during assembly or disassembly. A new actuator assembly and sleeve could be installed in the reversed manner.

In summary, every actuator is installed to the back of the mirror using the coupling described in FIG. 2. Using the principle shown in FIG. 3, a shaped memory metal sleeve is installed in the reaction plate at every actuator location. Each sleeve does not touch the actuator stem running through it. A gap exists there between and is filled with epoxy through the central hole and bonds the actuator, through the sleeve, to the reaction plate. The sleeve is configured so that upon cooling it shrinks in diameter and releasably secures the actuator to the reaction plate. Undoing the joint permits the entire actuator assembly to be removed through the opening in the reaction plate.

I claim:

1. An assembly comprising:
   a support having at least one opening therein;
   a thin optical substrate having a light reflective first surface and an opposite back surface;
   coupling means for controllably movably coupling said back surface of said optical substrate and said support to one another; and
   said coupling means including at least one shaped memory metal cylindrical part operatively connecting the optical substrate and the support.

2. An assembly as defined in claim 1 further characterized in that said actuator is comprised of a sleeve which is mounted into the at least one opening and has an internal confine which receives an actuator stem.

3. An assembly as defined in claim 2 further characterized in that said assembly an epoxy pinning is provided between the actuator stem and the internal surface of the sleeve to ensure a moment (stress and strain) free connection.

4. An assembly as defined in claim 3 further characterized in that said sleeve is said at least one shaped memory metal cylindrical part.

5. An assembly as defined in claim 1 further characterized in that and the back face of the substrate has at least one mount and said coupling means includes an at least one stem and said shaped memory metal cylindrical part connects the at least one mount and the at least one stem.

6. An assembly as defined in claim 5 further characterized in that said shaped memory metal cylindrical part is defined by a cylindrical fitting.

7. An assembly as defined in claim 1 further characterized in that said coupling means includes two shaped memory metal cylindrical parts.

8. An assembly as defined in claim 7 further characterized in that said back face of the substrate has at least one mount and said coupling means includes an at least one stem and one of said shaped memory metal cylindrical parts connects the at least one mount and the at least one stem.

9. An assembly as defined in claim 8 further characterized in that said actuator is comprised of a sleeve which is mounted into the at least one opening in said support and has an internal confine which receives an actuator stem, said sleeve being the second one of said two shaped memory metal cylindrical parts.

10. An assembly as defined in claim 9 further characterized in that an epoxy connection is provided between the sleeve and the actuator stem.

* * * * *